US012755478B2

(12) United States Patent
Ding et al.

(10) Patent No.: US 12,755,478 B2
(45) Date of Patent: Oct. 6, 2026

(54) METHOD FOR THREE-VIEW EXTRACTION AND PARTICLE 3D DISTRIBUTION RECONSTRUCTION OF TRICHROMATIC MASK PIV

(71) Applicant: TAIYUAN UNIVERSITY OF TECHNOLOGY, Taiyuan (CN)

(72) Inventors: Junfei Ding, Taiyuan (CN); Yiqun Liu, Taiyuan (CN); Xiaoyi Liang, Taiyuan (CN); Yong Zhang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 101 days.

(21) Appl. No.: 19/013,747

(22) Filed: Jan. 8, 2025

(65) Prior Publication Data

US 2026/0105679 A1 Apr. 16, 2026

(30) Foreign Application Priority Data

Oct. 11, 2024 (CN) ......................... 202411419237.3

(51) Int. Cl.
*G06T 15/08* (2011.01)
*G06T 3/4015* (2024.01)

(52) U.S. Cl.
CPC ............ *G06T 15/08* (2013.01); *G06T 3/4015* (2013.01)

(58) Field of Classification Search
CPC .................. G06T 15/08; G06T 3/4015; G06T 2207/10024; G06T 2207/20081; G06T 7/50
See application file for complete search history.

(56) References Cited

U.S. PATENT DOCUMENTS

2021/0232091 A1* 7/2021 Hong ................ G01N 15/0227
2025/0173819 A1* 5/2025 Kim .................... G06V 10/764

* cited by examiner

*Primary Examiner* — Grace Q Li
(74) *Attorney, Agent, or Firm* — JEEN IP LAW, LLC

(57) ABSTRACT

This application relates to the technical field of 3D-3C velocity measurement, and provides a method for three-view extraction and particle 3D distribution reconstruction of trichromatic mask PIV, including: color particle image shooting, color channel separation, preliminary 3D reconstruction, and 3D reconstruction refining by using a convolutional neural network model. According to this application, color channel separation is performed on a color particle image using a demosaicing algorithm based on a U-Net++ neural network, enabling high-quality image reconstruction during efficient network extraction. The convolutional neural network model is employed for 3D reconstruction, significantly reducing the particle elongation effect and aligning the spatial position and intensity distribution of particles more closely with the actual conditions. The method enhances computational efficiency and provides higher resolution in the depth of field direction.

6 Claims, 6 Drawing Sheets

(a)Instantaneous velocity fields at t=0.29T (b)Instantaneous velocity fields at t=0.48T

METHOD FOR THREE-VIEW EXTRACTION AND PARTICLE 3D DISTRIBUTION RECONSTRUCTION OF TRICHROMATIC MASK PIV

CROSS REFERENCE TO RELATED APPLICATION

This patent application claims the benefit and priority of Chinese Patent Application No. 2024114192373, filed with the China National Intellectual Property Administration on Oct. 11, 2024, the disclosure of which is incorporated by reference herein in its entirety as part of the present application.

TECHNICAL FIELD

The present disclosure relates to the technical field of three-dimensional and three-component (3D-3C) velocity measurement, and in particular to a method for three-view extraction and particle 3D distribution reconstruction of trichromatic mask particle image velocimetry (PIV).

BACKGROUND

PIV is a non-contact flow field measurement technique that accurately captures instantaneous quantitative information across the whole flow field and is widely utilized for visualizing and measuring flow field structures. Tomographic PIV (Tomo-PIV) is a 3D-3C velocity measurement technique capable of measuring instantaneous velocities in unsteady 3D flow fields. The technology uses three to six cameras to record tracer particles in the measured fluid area from different perspectives, and calculates the velocity field information using a reconstruction algorithm combined with a 3D cross-correlation algorithm. The 3D reconstruction of particles is a crucial step, as the step determines the intensity distribution of particles in 3D space. The quality of the results obtained affects the measurement accuracy of the final flow field. However, the requirement for a large number of cameras in Tomo-PIV complicates the arrangement when there are limitations on the number and size of optical measurement windows. In contrast, Trichromatic Mask PIV is a single-camera technique. This approach involves placing a trichromatic mask apparatus in front of the lens of a single-color camera. The apparatus consists of three narrow-band filters with different central wavelengths and a black mask, which features light holes arranged according to specific rules to create fixed parallax. The apparatus alters the imaging optical path, encoding parallax information into color information. Consequently, particle image information from three views can be captured simultaneously and recorded in different color channels of a color particle image. Once the color channels of the trichromatic mask color particle image are separated and the three-view image is extracted, it is necessary to reconstruct the spatial distribution of particles using methods akin to Tomo-PIV. Ultimately, the 3D velocity field is derived using the cross-correlation algorithm.

However, due to the limited parallax associated with single-camera imaging, traditional reconstruction methods, such as the multiplicative line-of-sight (MLOS) simultaneous multiplicative algebraic reconstruction technique (MART), which are suitable for Tomo-PIV, may require hundreds of iterations for trichromatic mask particle image reconstruction. As a result, particles that should theoretically be reconstructed as spheres often exhibit significant elongation effects along the depth of field, appearing spindle-shaped or even resembling needles. This elongation severely impacts reconstruction accuracy and diminishes spatial measurement resolution in the depth of field direction.

SUMMARY

In order to overcome the shortcomings of the prior art, the present disclosure aims to provide a method for three-view extraction and particle 3D distribution reconstruction of trichromatic mask PIV. Color channel separation is performed on a color particle image using a demosaicing algorithm based on a U-Net++ neural network, enabling high-quality image reconstruction during efficient network extraction. A convolutional neural network model is employed for 3D reconstruction, reducing the particle elongation effect and aligning the spatial position and intensity distribution of particles more closely with the actual conditions. The method enhances computational efficiency and resolution in the depth of field direction.

To achieve the above objective, the present disclosure provides the following technical solutions.

A method for three-view extraction and particle 3D distribution reconstruction of trichromatic mask PIV includes:

- shooting a color particle image;
- separating color channels of the color particle image by using a demosaicing algorithm based on a U-Net++ neural network, to obtain a three-view particle grayscale image, where the U-Net++ neural network includes a first output layer, a second output layer, and a third output layer with extraction depth increasing sequentially;
- performing preliminary 3D reconstruction on the three-view particle grayscale image by using an MLOS algorithm, to obtain an initial voxel field; and
- performing 3D reconstruction refining on the initial voxel field by using a trained convolutional neural network model, to obtain a fine voxel field, where
- a process of training the convolutional neural network model includes:
- setting optical parameters and calculating a projection transformation matrix according to the optical parameters;
- setting a plurality of particle concentrations, and randomly generating an equal particle spatial intensity voxel field according to the particle concentrations;
- converting the equal particle spatial intensity voxel field into a to-be-trained two-dimensional (2D) particle grayscale image by using the projection transformation matrix;
- performing preliminary 3D reconstruction on the to-be-trained 2D particle grayscale image by using the MLOS algorithm, to obtain a to-be-trained voxel field;
- randomly dividing the to-be-trained voxel field according to a preset proportion into a training set, a verification set, and a test set;
- constructing a network model, where the network model includes a plurality of hidden network layers including a 3D convolution layer, a batch normalization layer, and an activation function layer;
- constructing a first loss function;
- training, according to the training set and the verification set, the network model using an adaptive moment estimation (Adam) optimizer and an exponential moving average (EMA) method, to obtain a trained to-be-tested model;

testing the to-be-tested model by using the test set, to obtain a test result; and outputting the to-be-tested model if the test result meets a preset standard, to obtain the convolutional neural network model.

Preferably, said separating color channels of the color particle image by using a demosaicing algorithm based on a U-Net++ neural network, to obtain a three-view particle grayscale image includes:

converting the color particle image into a red-green-green-blue (RGGB) format, to obtain a four-channel image;

performing blurring processing on the four-channel image through Gaussian smoothing, to obtain receptive field features;

splicing the receptive field features by using a densely-connected structure, to obtain a feature map; and splicing and up-sampling the feature map layer by layer, to obtain the three-view particle grayscale image.

Preferably, the U-Net++ neural network is used for training a second loss function:

$$L = \begin{cases} L1^{SSIM} + L2^{SSIM} + L3^{SSIM}, & epoch \leq 10 \\ L1^{MSE} + L2^{MSE} + L3^{MSE}, & epoch > 10 \end{cases},$$

where

L is the second loss function; L1, L2, and L3 are the first output layer, the second output layer, and the third output layer, respectively; SSIM is a structural similarity index (SSIM); MSE is a mean square error (MSE); and epoch is a number of epochs.

Preferably, the optical parameters include a pixel size, a focal length, a nominal aperture, a particle imaging area, a measurement area size, a diameter of a single mask hole, a magnification, and a radius of a circumscribed circle around a center of the mask hole.

Preferably, the first loss function is:

$$\text{Loss} = 1 - \frac{2\sum_i (E_{0_i} \cdot E_{pred_i})}{\sum_i E_{0_i}^2 + \sum_i E_{pred_i}^2},$$

where

Loss is the loss function; and $E_{0_i}$ and $E_{Pred_i}$ are intensity values of the equal particle spatial intensity voxel field and a predicted voxel field obtained from the network model at a position i.

Preferably, a formula for calculating the test result is:

$$Q = \frac{\sum_i E_{0_i} \cdot E_{1_i}}{\sqrt{\sum_i E_{0_i}^2 \cdot \sum_i E_{1_i}^2}},$$

where $Q$ is the test result; and $E_{1_i}$ is an intensity value of a reconstructed voxel obtained from the to-be-tested model at the position i.

The present disclosure provides the following technical effects:

The present disclosure provides a method for three-view extraction and particle 3D distribution reconstruction of trichromatic mask PIV. Color channel separation is performed on a color particle image using a demosaicing algorithm based on a U-Net++ neural network. This approach addresses the issue of poor extraction quality in conventional technologies, enabling high-quality image reconstruction during efficient network extraction. Additionally, a convolutional neural network model is employed for 3D reconstruction, effectively overcoming the limitations of strong particle elongation and low computational efficiency in the prior art, allowing for quick and accurate reconstruction of particle 3D distribution.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can still be derived from these accompanying drawings by those of ordinary skill in the art without creative efforts.

FIG. 5A shows an instantaneous velocity field at a moment t=0.29T, and FIG. 5B shows an instantaneous velocity field at a moment t=0.48T.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other examples obtained by a person of ordinary skill in the art based on the examples of the present disclosure without creative efforts shall fall within the protection scope of the present disclosure.

The present disclosure aims to provide a method for three-view extraction and particle 3D distribution reconstruction of trichromatic mask PIV. Color channel separation is performed on a color particle image using a demosaicing algorithm based on a U-Net++ neural network, enabling high-quality image reconstruction during efficient network extraction. A convolutional neural network model is employed for 3D reconstruction, reducing the particle elongation effect and aligning the spatial position and intensity distribution of particles more closely with the actual conditions. The method enhances computational efficiency and resolution in the depth of field direction.

To make the foregoing objective, features, and advantages of the present disclosure clearer and more comprehensible, the present disclosure is further described in detail below with reference to the accompanying drawings and specific examples.

Figure 1:
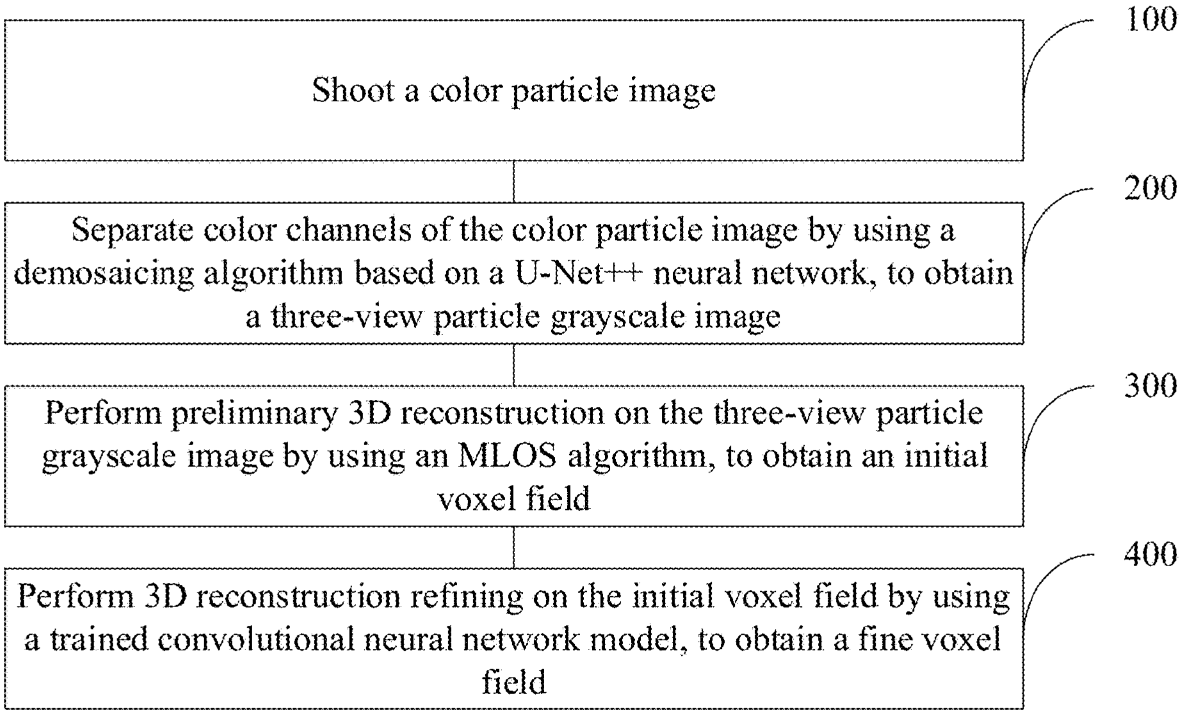
FIG. 1 is a schematic flowchart of three-view extraction and particle 3D distribution reconstruction of trichromatic mask PIV according to an embodiment of the present disclosure.

FIG. 1 is a schematic flowchart of three-view extraction and particle 3D distribution reconstruction of trichromatic mask PIV according to an embodiment of the present disclosure. As shown in FIG. 1, the present disclosure provides a method for three-view extraction and particle 3D distribution reconstruction of trichromatic mask PIV, including:

Step 100: Shoot a color particle image.

Step 200: Separate color channels of the color particle image by using a demosaicing algorithm based on a U-Net++ neural network, to obtain a three-view particle grayscale image, where the U-Net++ neural network includes a first output layer, a second output layer, and a third output layer with extraction depth increasing sequentially.

Step 300: Perform preliminary 3D reconstruction on the three-view particle grayscale image by using an MLOS algorithm, to obtain an initial voxel field.

Step 400: Perform 3D reconstruction refining on the initial voxel field by using a trained convolutional neural network model, to obtain a fine voxel field.

A process of training the convolutional neural network model includes:

- setting optical parameters and calculating a projection transformation matrix according to the optical parameters;
- setting a plurality of particle concentrations, and randomly generating an equal particle spatial intensity voxel field according to the particle concentrations;
- converting the equal particle spatial intensity voxel field into a to-be-trained 2D particle grayscale image by using the projection transformation matrix;
- perform preliminary 3D reconstruction on the to-be-trained 2D particle grayscale image by using the MLOS algorithm, to obtain a to-be-trained voxel field;
- randomly dividing the to-be-trained voxel field according to a preset proportion into a training set, a verification set, and a test set;
- constructing a network model, where the network model includes a plurality of hidden network layers including a 3D convolution layer, a batch normalization layer, and an activation function layer;
- constructing a loss function;
- training, according to the training set and the verification set, the network model using an Adam optimizer and an EMA method, to obtain a trained to-be-tested model;
- testing the to-be-tested model by using the test set, to obtain a test result; and
- outputting the to-be-tested model if the test result meets a preset standard, to obtain the convolutional neural network model.

Optionally, the optical parameters include a pixel size, a focal length, a nominal aperture, a particle imaging area, a measurement area size, a diameter of a single mask hole, a magnification, and a radius of a circumscribed circle around a center of the mask hole.

Preferably, said separating color channels of the color particle image by using a demosaicing algorithm based on a U-Net++ neural network, to obtain a three-view particle grayscale image includes:

- converting the color particle image into an RGGB format, to obtain a four-channel image;
- performing blurring processing on the four-channel image through Gaussian smoothing, to obtain receptive field features;
- splicing the receptive field features by using a densely-connected structure, to obtain a feature map; and
- splicing and up-sampling the feature map layer by layer, to obtain the three-view particle grayscale image.

Specifically, the U-Net++ neural network is used for training a second loss function:

$$L = \begin{cases} L1^{SSIM} + L2^{SSIM} + L3^{SSIM}, & epoch \le 10 \\ L1^{MSE} + L2^{MSE} + L3^{MSE}, & epoch > 10 \end{cases}.$$

L is the second loss function; L1, L2, and L3 are the first output layer, the second output layer, and the third output layer, respectively; SSIM is a structural similarity index; MSE is a mean squared error; and epoch is a number of epochs.

Specifically, the first loss function is:

$$\text{Loss} = 1 - \frac{2\sum_i \left(E_{0_i} \cdot E_{pred_i}\right)}{\sum_i E_{0_i}^2 + \sum_i E_{pred_i}^2}.$$

Loss is the loss function; and $E_{0_i}$ and $E_{pred_i}$ are intensity values of the equal particle spatial intensity voxel field and a predicted voxel field obtained from the network model at a position i.

Further, a formula for calculating the test result is:

$$Q = \frac{\sum_i E_{0_i} \cdot E_{1_i}}{\sqrt{\sum_i E_{0_i}^2 \cdot \sum_i E_{1_i}^2}}.$$

$Q$ is the test result; and $E_{1_i}$ is an intensity value of a reconstructed voxel obtained from the to-be-tested model at the position i.

Specifically, using a neural network for particle reconstruction can significantly reduce the particle elongation effect, transforming the particle shape into a circle. The spatial position and intensity distribution of the particles align closely with the actual conditions, resulting in higher resolution in the depth of field direction. The reconstruction prediction performance of the neural network model is validated using data of the test set. The reconstruction quality under different parallax conditions is evaluated using the reconstruction quality factor (test result) as the evaluation index (with a particle concentration of 0.05 ppp). Additionally, the results are compared with the MLOS-SMART method (the calculation results of the reconstruction quality factor are shown in Table 1).

$$Q = \frac{\sum_i E_{0_i} \cdot E_{1_i}}{\sqrt{\sum_i E_{0_i}^2 \cdot \sum_i E_{1_i}^2}}$$

The value range of $Q$ is between 0 and 1, and a higher value of $Q$ indicates better reconstruction quality. The particle concentration is fixed, and the quality of the reconstruction results of different algorithms is evaluated under varying parallax conditions.

TABLE 1

| Magnification M | Mask hole spacing (mm) | Reconstruction quality factor MLOS-SMART | Neural network |
|---|---|---|---|
| −1 | 32 | 0.58 | 0.77 |
| | 16 | 0.42 | 0.70 |
| | 8 | 0.31 | 0.54 |
| −0.5 | 32 | 0.46 | 0.66 |
| | 16 | 0.35 | 0.62 |
| | 8 | 0.26 | 0.42 |
| −0.2 | 32 | 0.34 | 0.51 |
| | 16 | 0.26 | 0.45 |
| | 8 | 0.19 | 0.34 |

Furthermore, when the parallax is fixed at a magnification of −1 and the mask hole spacing is 32 mm, test samples with different particle concentrations are selected. The reconstruction quality under varying particle concentrations is evaluated using the reconstruction quality factor as the evaluation index and the results are compared with the MLOS-SMART method. The parallax is fixed, and the quality of the reconstruction results of different algorithms is evaluated under varying particle concentrations. The evaluation results are shown in Table 2.

TABLE 2

| Algorithm | Q Particle concentration (ppp) 0.01 | 0.05 | 0.1 | 0.15 | 0.2 |
|---|---|---|---|---|---|
| MLOS-SMART | 0.58 | 0.54 | 0.44 | 0.35 | 0.29 |
| Neural network | 0.93 | 0.77 | 0.60 | 0.48 | 0.39 |

Preferably, the use of the neural network can significantly enhance particle reconstruction speed while maintaining stable performance and higher reconstruction efficiency. In contrast, the reconstruction speed of the MLOS-SMART method is affected by the number of epochs, particle concentration, and parallax.

Specifically, a specific procedure of a method for particle 3D distribution reconstruction of trichromatic mask PIV using a single-color camera is as follows:

S1: Set optical parameters. Specifically, based on the camera parameter configuration conditions used in the experiment, the optical parameters are set, including a pixel size, a focal length, a nominal aperture, a particle imaging area, a measurement area size, a single mask hole diameter, a magnification, and a radius of a circumscribed circle around a center of the mask hole (mask hole spacing). The combination of the magnification and the mask hole spacing determines the shooting parallax. The magnification is defined as follows:

$$M=-S_I/S_O$$

M indicates the magnification, and $S_I$ and $S_O$ respectively indicate an image distance and an object distance.

S2: Calculate a projection transformation matrix at each imaging views according to the optical parameters.

S3: Set a plurality of particle concentrations, randomly generate particle space coordinates according to the particle concentrations, and assign values to a spatial voxel field using the Gaussian intensity distribution, to obtain a true voxel field $E_0$, which serves as the labeled data sample for the neural network. The number of samples for each particle concentration should be consistent.

S4: For each voxel field, generate a 2D particle grayscale image for each view using the projection transformation matrix, and simulate a full-frame three-view particle image obtained after color channel separation.

Figure 2:
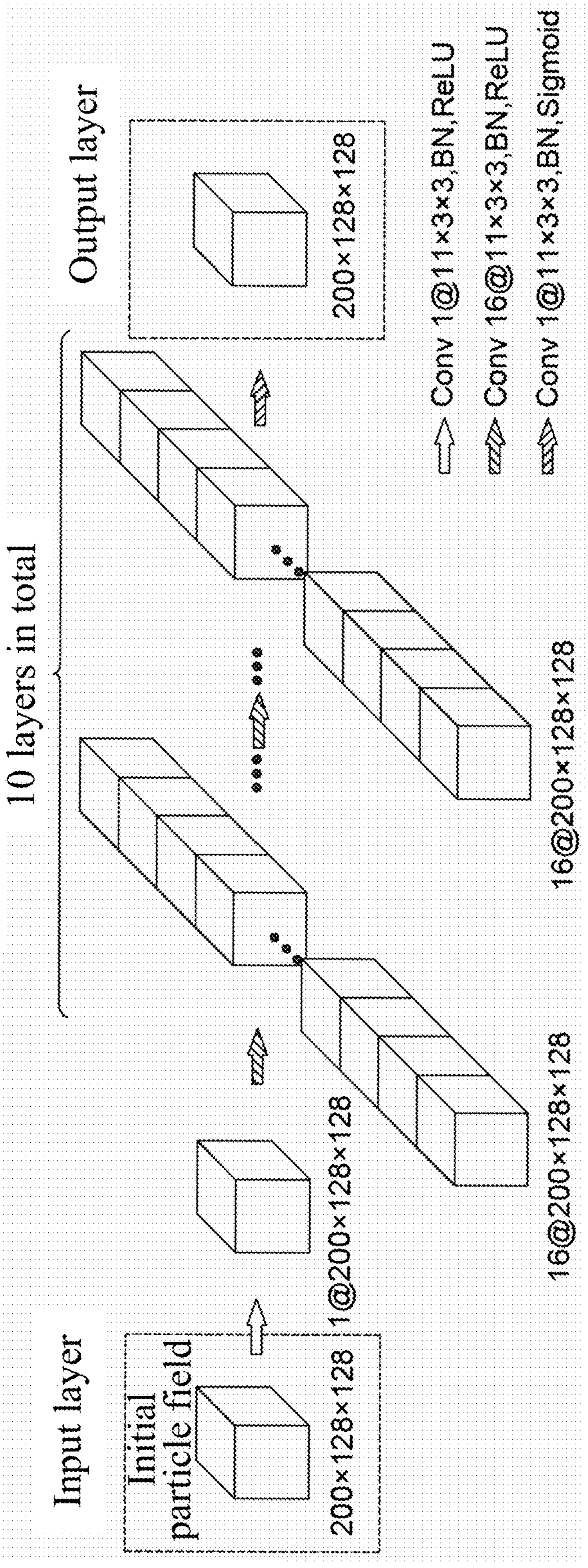
FIG. 2 is a structural diagram of a convolutional neural network according to an embodiment of the present disclosure.

S5: Preliminarily reconstruct the particle image using the MLOS algorithm, to obtain the initially assigned voxel field $E_{MLOS}$ as the input data sample for the neural network. With reference to FIG. 2, the voxel field size of the to-be-trained sample is 200×128×128 voxels, with 200 voxels in the depth direction.

S6: After grouping and shuffling, divide the data samples with different concentrations into a training set, a verification set, and a test set according to the proportion.

S7: Perform network training. A convolutional neural network (with reference to FIG. 2) is used, each hidden layer consists of a 3D convolution layer, a batch normalization layer, and an activation function layer. The depth dimension of the 3D convolution layer is set to be larger than the height and width dimensions, allowing for a larger receptive field in the depth direction, and enabling the network to learn more features in the depth direction. All activation functions, except for the last hidden layer, adopt the ReLU function, while the activation function of the last hidden layer employs the Sigmoid function. Referring to FIG. 2, the neural network is configured with ten hidden layers, each having 16 channels, while the other hidden layers have one channel. The size of the voxel field remains consistent across all layers of the network. The neural network employs Dice Loss as the loss function, and the formula is as follows:

$$\text{Loss}=1-\frac{2\sum_i\left(E_{0_i}\cdot E_{pred_i}\right)}{\sum_i E_{0_i}^2+\sum_i E_{pred_i}^2}$$

The network parameters are optimized and updated according to the loss function using the Adam optimization method and an EMA training strategy.

S8: Shoot a trichromatic mask PIV experimental particle image, and separate the color channels using the demosaicing algorithm, to obtain a three-view particle image.

S9: Reconstruct the particle image using the MLOS algorithm.

S10: Refine and reconstruct, using the trained neural network model, the voxel field obtained by using the MLOS algorithm, to obtain a fine voxel field. This process enhances the shape and intensity distribution of 3D particles, reduces the particle elongation effect, and ultimately improves reconstruction accuracy. Additionally, this step is computationally efficient and quick.

Figure 3:
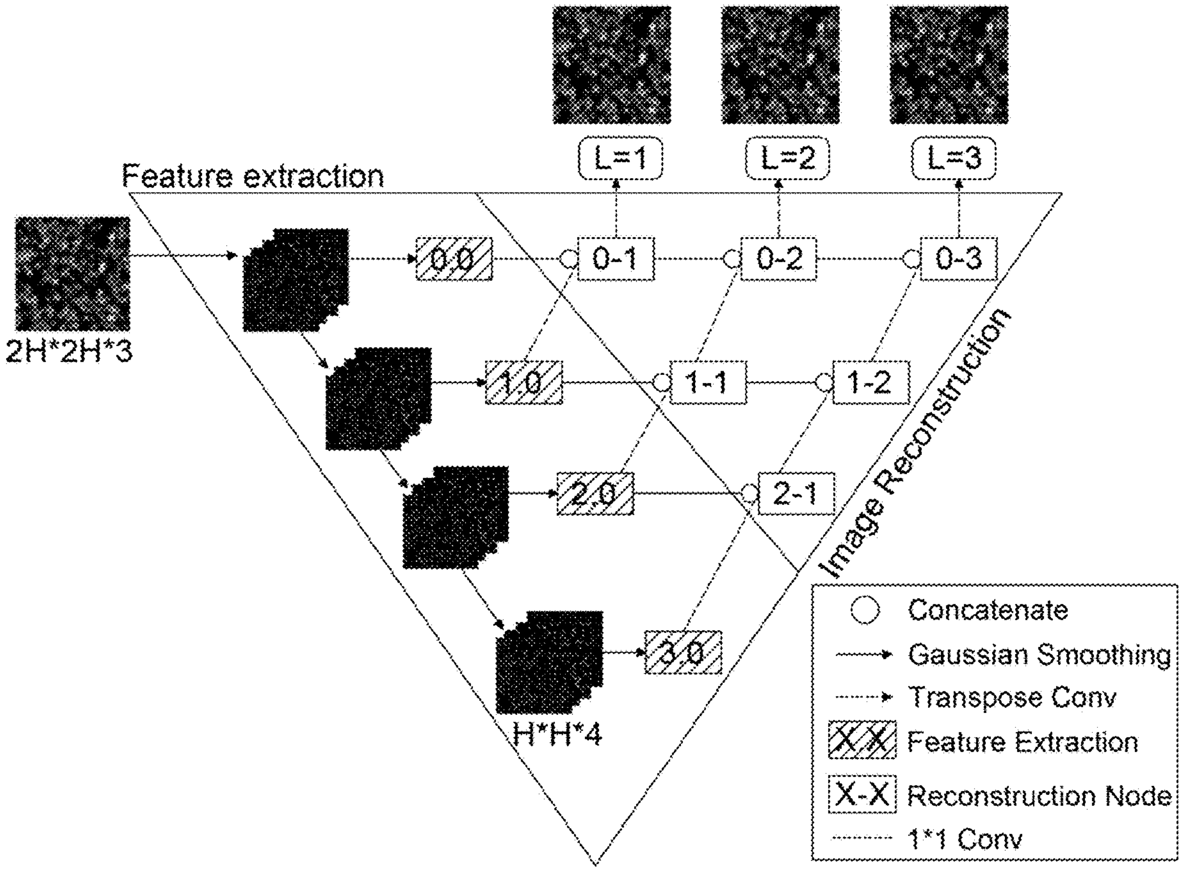
FIG. 3 is a schematic diagram of a network structure of a demosaicing algorithm according to an embodiment of the present disclosure.

Preferably, the three-view extraction method in this embodiment is a demosaicing algorithm designed based on the structure of the U-Net++ neural network. The network structure consists of two phases: image feature extraction and image reconstruction, as shown in FIG. 3. The white box represents the image feature extraction phase, including Gaussian smoothing and feature extraction modules at different layers. The gray box represents the image reconstruction phase, including channel concatenation operations, reconstruction nodes, and the final up-sampling layers. Related signs in FIG. 3 are explained as follows: Feature extraction: the feature extraction phase; Image Reconstruction: the image reconstruction phase; Concatenate: the concatenation operation; Gaussian Smoothing: Gaussian smoothing; Transpose Conv: transpose convolution; Feature Extraction: a feature extraction module; Reconstruction Node: a reconstruction node; 1*1 Conv: 1*1 convolution.

Furthermore, during image processing, image feature extraction and image reconstruction are two crucial steps. First, the image feature extraction phase processes the input image using Gaussian smoothing and the feature extraction module. Specifically, Gaussian smoothing preserves the image size and expands the receptive field by blurring the image to varying degrees, allowing for comprehensive feature extraction without losing important information. Then, the feature extraction module employs a densely-connected structure to splice and process feature maps at different levels, thereby reducing the number of network parameters while ensuring thorough mining of image features. In the image reconstruction phase, feature maps from different layers are combined in the channel dimension through channel concatenation operations to synthesize information from different layers. The spliced feature maps are then processed layer by layer using the reconstruction nodes to further integrate and enhance the image information. Finally, after the up-sampling operation, the reconstruction phase restores the feature map to the resolution of the original input image, ensuring that the size and details of the output image align with those of the input image. This results in a high-quality demosaiced image and completes the three-view extraction of the particle image. In this way, the entire network achieves high-quality image reconstruction while maintaining efficient processing.

Preferably, the loss function used in model training is divided into two parts. In the initial ten epochs, the SSIM of the image is employed as the loss function to help the network quickly learn the structural information of the image. After ten epochs, the MSE of the image is used as the loss function, allowing the network to gradually learn the details of the image.

Specifically, because the U-Net++ network includes three layers of outputs, it is necessary to consider the losses output by L1, L2, and L3 in combination as the final loss function during training. Therefore, the final loss function of network training is represented as:

$$L = \begin{cases} L1^{SSIM} + L2^{SSIM} + L3^{SSIM}, \ epoch \le 10 \\ L1^{MSE} + L2^{MSE} + L3^{MSE}, \ epoch > 10 \end{cases}$$

L1, L2, and L3 represent the outputs of the network at different depth layers, and correspond to intermediate results produced at different phases in the image reconstruction process. These output forms reflect the feature extraction and processing ability of the network on the input image at different layers, and are usually used to evaluate and optimize the model performance. The outputs of L1, L2, and L3 correspond to demosaicing results with different levels of detail. The output results of L1, L2, and L3 are all the results of particle image demosaicing, differing in terms of feature extraction depth and algorithm processing time. In some demosaicing scenarios that require general background information of the whole image, the output of L1 may be selected. Conversely, in scenarios that demand specific image information recovery, the output of L3, even deeper, may be selected. This process reflects a balance between demosaicing accuracy and time efficiency.

Preferably, the advantage of using the U-Net++ neural network is as follows: Outputs from different levels can be obtained when training in this deeply supervised manner. A sub-network can then be selected from the entire model as a trade-off between the demosaicing computational costs and accuracy. Additionally, a Gaussian smoothing layer is used instead of a pooling layer to expand the receptive field of the input mosaic image while keeping the image size unchanged. Furthermore, a densely-connected layer unit adopting depthwise separable convolution is inserted at the beginning of each layer to fully extract features of the mosaic image with a small number model parameters. Before input into the network, the input mosaic image is arranged into a four-channel pattern of RGGB and blurred separately through a Gaussian kernel for the number of times according to the level of the network at the corresponding layer. By combining feature maps from different scales, the expressive ability and performance of the model are enhanced. The feature maps at each layer are concatenated with the feature maps from the former layer and the lower layers, passing through the reconstruction nodes layer by layer until reaching the top layer. Finally, the results are output as L1, L2, and L3.

Furthermore, through the multi-layer supervised training, during the training process, different output layers (L1, L2, and L3) of the network participate in the loss calculation. This multi-layer supervision mechanism helps to optimize the feature extraction and image reconstruction capabilities of the network on a layer-by-layer basis. The convolutional neural network is used, each hidden layer consists of a 3D convolution layer, a batch normalization layer, and an activation function layer. The depth dimension of the 3D convolution layer is set to be larger than the height and width dimensions, allowing for a larger receptive field in the depth direction, and enabling the network to learn more features in the depth direction. All activation functions, except for the last hidden layer, adopt the ReLU function, while the activation function of the last hidden layer employs the Sigmoid function.

Figure 4:
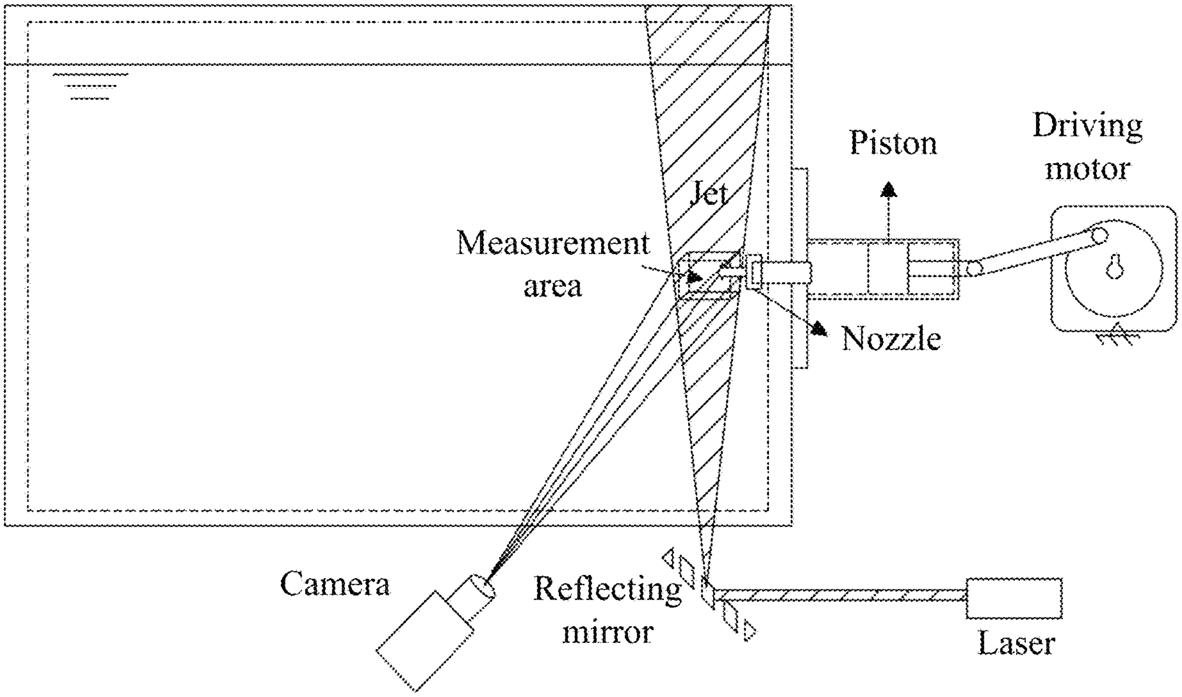
FIG. 4 is a schematic structural diagram of an experimental apparatus according to an embodiment of the present disclosure.

Specifically, a trichromatic mask imaging system and an experimental zero-net-mass-flux jet are constructed. A three-band white laser was used in the experiment, with a beam power of 3 W and wavelengths of 450 nm, 532 nm, and 650 nm, respectively. A customized trichromatic mask was installed in front of a lens ZEISS Milvus 2/100M and connected with a color camera Revealer M120, to construct the trichromatic mask imaging system. The camera resolution is 1024×1280 and the pixel size is 10 μm×10 μm. The experimental apparatus is shown in FIG. 4. The water tank is constructed from 15 mm thick acrylic with dimensions of 1000 mm in length, 500 mm in width, and 500 mm in height. The piston half stroke is set to 13 mm, with a driving frequency f of 0.25 Hz. The experimental Strouhal number is 0.77 and Reynolds number is 32. The diameter of the jet circular nozzle is D=10 mm. The measurement area is located at 0.1D on the left side of the nozzle, and the measurement volume is defined as 2D×2D×0.4D distributed along x, y and z directions. Polyamide tracer particles with a diameter of 20 μm and a density of 1.03 $g/cm^3$ were used. A particle concentration was approximately 0.04 PPP. The experimental camera was set to 150 fps.

Figure 5A:
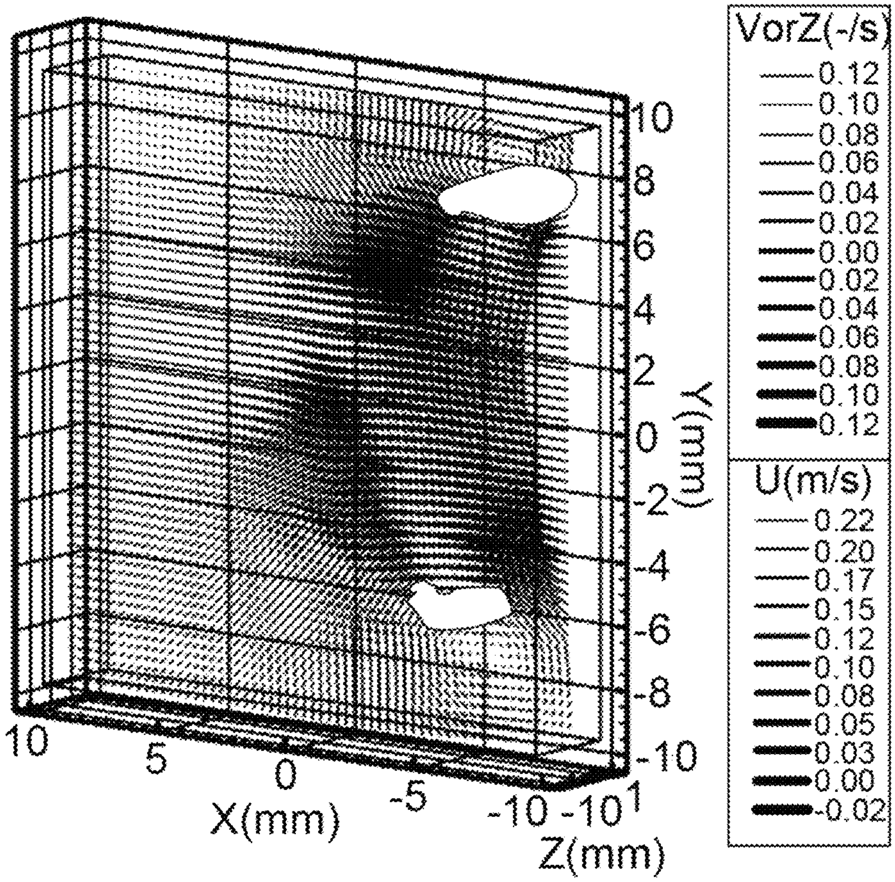
FIGS. 5A-5B are simulation diagrams of an instantaneous velocity field according to an embodiment of the present disclosure, where
Figure 5B:
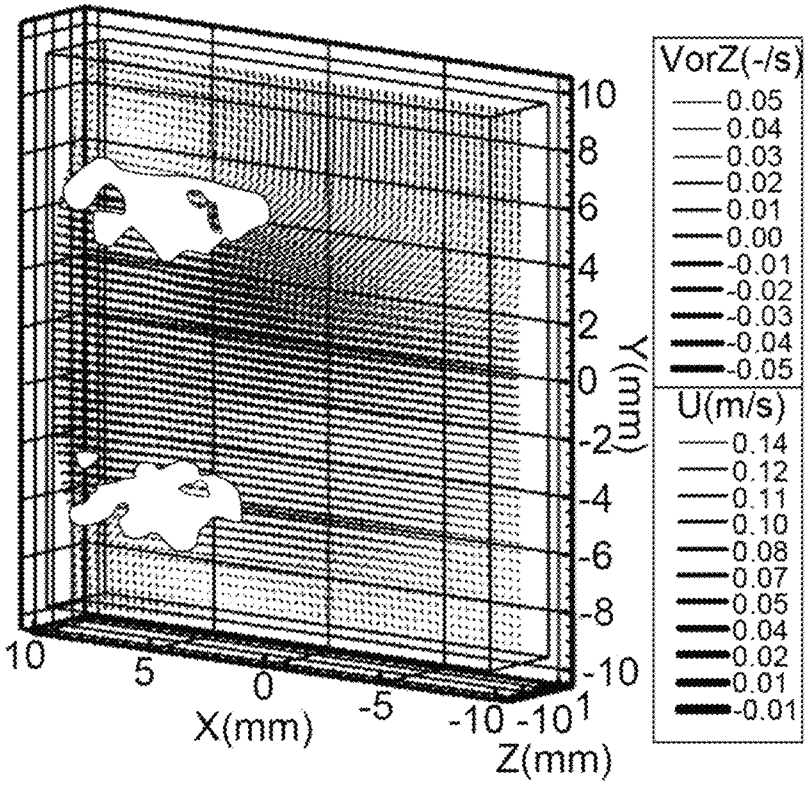

Furthermore, the instantaneous velocity field is calculated using a multi-grid 3D cross-correlation algorithm. The window size of the first grid is 64×64×64 voxels, and the window size of the second grid is 32×32×32 voxels, with an overlap rate of 50%. The reconstructed results are processed using a 3×3×3 median filter, and outliers are replaced using linear interpolation. FIGS. 5A-5B show diagrams of instantaneous velocity fields from the final calculation at two jet moments. In the figure, VorZ represents the vorticity in the Z direction and T represents the period of the jet in the zero-net-mass-flux jet experiment. In FIG. 5A and FIG. 5B, arrows represent the velocity vectors; the length of each arrow is proportional to the velocity, while the color of the arrow indicates the distribution of velocity values. The isosurface is drawn based on the vorticity in the Z direction. The three-view image extracted through demosaicing using the U-Net++ neural network, along with the particle 3D distribution reconstruction based on the convolutional neural network, demonstrates a complete vorticity structure and accurate velocity distribution.

The present disclosure has the following beneficial effects:

According to the present disclosure, color channel separation is performed on the color particle image using a demosaicing algorithm based on a U-Net++ neural network, enabling high-quality image reconstruction during efficient network extraction. A convolutional neural network model is employed for 3D reconstruction, significantly reducing the particle elongation effect and aligning the spatial position and intensity distribution of particles more closely with the actual conditions. The method enhances computational efficiency and provides higher resolution in the depth of field direction.

Each example of the present specification is described in a progressive manner, each example focuses on the difference from other examples, and the same and similar parts between the examples may refer to each other.

In this specification, several examples are used for illustration of the principles and implementations of the present disclosure. The description of the foregoing examples is used to help illustrate the method of the present disclosure and the core principles thereof. In addition, those of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A method for three-view extraction and particle three-dimensional (3D) distribution reconstruction of trichromatic mask particle image velocimetry (PIV), comprising:

shooting a color particle image;

separating color channels of the color particle image by using a demosaicing algorithm based on a U-Net++ neural network, to obtain a three-view particle grayscale image, wherein the U-Net++ neural network comprises a first output layer, a second output layer, and a third output layer with extraction depth increasing sequentially;

performing preliminary 3D reconstruction on the three-view particle grayscale image by using a multiplicative line-of-sight (MLOS) algorithm, to obtain an initial voxel field; and performing 3D reconstruction refining on the initial voxel field by using a trained convolutional neural network model, to obtain a fine voxel field, wherein a process of training the convolutional neural network model comprises:

setting optical parameters and calculating a projection transformation matrix according to the optical parameters;

setting a plurality of particle concentrations, and randomly generating an equal particle spatial intensity voxel field according to the particle concentrations;

converting the equal particle spatial intensity voxel field into a to-be-trained two-dimensional (2D) particle grayscale image by using the projection transformation matrix;

performing preliminary 3D reconstruction on the to-be-trained 2D particle grayscale image by using the MLOS algorithm, to obtain a to-be-trained voxel field;

randomly dividing the to-be-trained voxel field according to a preset proportion into a training set, a verification set, and a test set;

constructing a network model, wherein the network model comprises a plurality of hidden network layers comprising a 3D convolution layer, a batch normalization layer, and an activation function layer;

constructing a first loss function;

training, according to the training set and the verification set, the network model using an adaptive moment estimation (Adam) optimizer and an exponential moving average (EMA) method, to obtain a trained to-be-tested model;

testing the to-be-tested model by using the test set, to obtain a test result; and outputting the to-be-tested model if the test result meets a preset standard, to obtain the convolutional neural network model.

2. The method for three-view extraction and particle 3D distribution reconstruction of trichromatic mask PIV according to claim 1, wherein said separating color channels of the color particle image by using a demosaicing algorithm based on a U-Net++neural network, to obtain a three-view particle grayscale image comprises:

converting the color particle image into a red-green-green-blue (RGGB) format, to obtain a four-channel image;

performing blurring processing on the four-channel image through Gaussian smoothing, to obtain receptive field features;

splicing the receptive field features by using a densely-connected structure, to obtain a feature map; and splicing and up-sampling the feature map layer by layer, to obtain the three-view particle grayscale image.

3. The method for three-view extraction and particle 3D distribution reconstruction of trichromatic mask PIV according to claim 1, wherein the U-Net++neural network is used for training a second loss function:

$$L = \begin{cases} L1^{SSIM} + L2^{SSIM} + L3^{SSIM}, \ epoch \leq 10 \\ L1^{MSE} + L2^{MSE} + L3^{MSE}, \ epoch > 10 \end{cases},$$

wherein

L is the second loss function; L1, L2, and L3 are the first output layer, the second output layer, and the third output layer, respectively; SSIM is a structural similarity index (SSIM); MSE is a mean square error (MSE); and epoch is a number of epochs.

4. The method for three-view extraction and particle 3D distribution reconstruction of trichromatic mask PIV according to claim 1, wherein the optical parameters comprise a pixel size, a focal length, a nominal aperture, a particle imaging area, a measurement area size, a diameter of a single mask hole, a magnification, and a radius of a circumscribed circle around a center of the mask hole.

5. The method for three-view extraction and particle 3D distribution reconstruction of trichromatic mask PIV according to claim 1, wherein the first loss function is:

$$\text{Loss} = 1 - \frac{2\sum_i (E_{0_i} \cdot E_{pred_i})}{\sum_i E_{0_i}^2 + \sum_i E_{pred_i}^2},$$

wherein

Loss is the loss function; and $E_{0_i}$ and $E_{pred_i}$ are intensity values of the equal particle spatial intensity voxel field and a predicted voxel field obtained from the network model at a position i.

6. The method for three-view extraction and particle 3D distribution reconstruction of trichromatic mask PIV according to claim 5, wherein a formula for calculating the test result is:

$$Q = \frac{\sum_i E_{0_i} \cdot E_{1_i}}{\sqrt{\sum_i E_{0_i}^2 \cdot \sum_i E_{1_i}^2}},$$

wherein $Q$ Q is the test result; and $E_{1_i}$ is an intensity value of a reconstructed voxel obtained from the to-be-tested model at the position i.

* * * * *